United States Patent
Sugihara et al.

(10) Patent No.: US 6,773,640 B2
(45) Date of Patent: Aug. 10, 2004

(54) PROCESS FOR INJECTION FOAMING, AND MACHINE AND COMPOSITION THEREFORE

(75) Inventors: Eiichi Sugihara, Chiba-ken (JP); Michio Eriguchi, Chiba-ken (JP); Masaki Misumi, Chiba-ken (JP)

(73) Assignee: Mitsui Chemicals, Inc., Tokyo (JP)

( * ) Notice: Subject to any disclaimer, the term of this patent is extended or adjusted under 35 U.S.C. 154(b) by 346 days.

(21) Appl. No.: 09/885,053

(22) Filed: Jun. 21, 2001

(65) Prior Publication Data

US 2002/0017734 A1 Feb. 14, 2002

(30) Foreign Application Priority Data

Jun. 22, 2000 (JP) .................................... 2000-187298

(51) Int. Cl.[7] .............................................. B29C 44/02
(52) U.S. Cl. ............................. 264/50; 264/51; 264/53; 264/54; 264/328.7
(58) Field of Search ......................... 264/54, 50, 51, 264/53, 328.7

(56) References Cited

U.S. PATENT DOCUMENTS

| | | | |
|---|---|---|---|
| 3,827,841 A | * | 8/1974 | Kawai et al. ............ 425/4 C |
| 4,133,858 A | | 1/1979 | Hayakawa et al. |
| 4,250,132 A | | 2/1981 | Beach |
| 4,393,017 A | * | 7/1983 | Kim et al. ................. 264/53 |
| 4,783,292 A | | 11/1988 | Rogers |
| 4,842,788 A | * | 6/1989 | Johnson .................... 264/68 |
| 5,160,674 A | | 11/1992 | Colton et al. |
| 6,322,347 B1 | * | 11/2001 | Xu ......................... 425/376.1 |

FOREIGN PATENT DOCUMENTS

| | | |
|---|---|---|
| EP | 0 430 292 A1 | 6/1991 |
| FR | 2.098.326 | 3/1972 |
| WO | WO 98/31521 | 7/1998 |

* cited by examiner

Primary Examiner—Allan R. Kuhns
(74) Attorney, Agent, or Firm—Burns, Doane, Swecker & Mathis, L.L.P.

(57) ABSTRACT

A process for injection-foaming a thermoplastic resin by using an injection molding machine with a two-stage-compression screw, injecting a physical foaming agent into the cylinder of the machine at a pressure lower than the storage pressure of the physical foaming agent, mixing it with a melted resin and expanding the volume of the cavity of the mold at the time of injection, and an injection molding machine and resin composition suitable therefore.

17 Claims, 3 Drawing Sheets

PROCESS FOR INJECTION FOAMING, AND MACHINE AND COMPOSITION THEREFORE

TECHNICAL FIELD

This invention relates to an injection foaming process in which a physical foaming agent is injected into an injection molding machine and mixed with a melted thermoplastic resin before injection foaming, and to an injection molding machine and resin composition suitable therefore. More specifically, this invention relates to a process for obtaining a foam by injecting a physical foaming agent into the cylinder of an injection molding machine at a pressure lower than the storage pressure of the physical foaming agent, mixing it with a melted resin and expanding the volume of the cavity of the mold at the time of injection, and to an injection molding machine and resin composition suitable therefore.

TECHNICAL BACKGROUND

In the past, study has been made of the use of an injection molding method using thermoplastic resin in which foaming is conducted with an aim of reducing materials usage and product weight. As the method for carrying out injection foaming, a method in which a chemical foaming agent of the thermal decomposition type such as azodicarboxylic acid amide is added directly to the raw material thermoplastic resin or used as a masterbatch is known.

Since such chemical forming agent is available easily and usable on a common in-line-type injection molding machine, it has been used widely in injection foaming. However, when a chemical foaming agent is added to pellets, a relatively large amount such as 1 to 5 wt % of the chemical foaming agent is needed, and in addition, the foaming agent in power state and the pellets got separated, causing uneven foaming. Besides, in the case of a chemical foaming agent being as a masterbatch, part of the foaming agent is decomposed due to the heat in the extruder when it is produced. This causes a problem of lower efficiency in the generation of gas at the time of injection foaming.

On top of that, chemical foaming agents are expensive, and this is making the materials cost higher. Some of them entails the generation of harmful gases such as carbon monoxide. Besides, in some cases, decomposition residues of a chemical foaming agent remained in the cylinder of the injection molding machine for a long time and appeared on the surfaces of molded articles from time to time, spoiling their appearance.

A proposal has also been made for physical foaming in which propane, nitrogen gas, carbon dioxide, or the like is used as the foaming agent in place of a chemical foam agent. Especially, the extrusion foaming method using these physical foaming agents is used widely for polystyrene paper, etc. In this extrusion foaming method, a physical foaming agent is injected under pressure into the cylinder of an extruder through a hole made in the middle of the cylinder (Japanese Patent Publication HEI7-16450 and Japanese Patent Publication HEI8-81590, for example). In the case of extrusion foaming, products whose dimensions and expansion ratio are stable can be obtained by keeping the feed rates of the raw material resin and the physical foaming agent constant.

On the other hand, in the case of the in-line-type injection molding method using a physical foaming agent in injection molding, it happens in some cases that even if a hole is made in the cylinder for the injection of the physical foaming agent, it cannot be injected into the cylinder, depending on the position of the screw, because the relationship between the position of the injection hole and that of the screw is not always constant unlike in the case of an extruder since the resin is plasticized, metered and injected as the screw moves forward and backward in the cylinder.

In this way, it has been much more difficult to feed a physical foaming agent to an injection molding machine than to an extruder. Because of this, proposals have been made for improving the injection foaming method.

For example, as the injection foaming method using an organic solvent as a physical foaming agent so that the physical foaming agent may not evaporate easily when the resin is transported to the injection molding machine, a method (Japanese Patent Publication SHO 46-2184) in which a mixture of an organic agent and a resin is fed intermittently to an injection molding machine and a method (Japanese Patent Publication HEI 6-41344) in which an organic solvent and a thermoplastic resin are mixed by means of an extruder and then injected directly into a mold have been proposed. These methods require that because of the use of an organic solvent, modifications be made to the equipment so that it will be changed to an explosion-proof type. Furthermore, in the case in which such mixture is injected into the mold from an extruder, melted resin is continuously fed to the mold from the extruder, and consequently the resin is discharged out of the system at the time of the removal of the product while the resin is in the process of being foamed. This presents the problems of a possibility of the molded article being smeared with such discharged resin and a high rate of production of defective articles.

On the other hand, another method in which resin is foamed after it is impregnated with a physical foaming agent in supercritical condition has been proposed. This technology is known as microcellular foam technology (U.S. Pat. No. 5,158,986 (Japanese Patent 2625576) and U.S. Pat. No. 4,473,665, among others). This microcellular foam technology provides products capable of retaining impact resistance, despite being a foam, by making the cell diameter of the foam smaller than that at which cell failure takes place.

Proposal has been made for improvements in the method for injecting such physical foaming agent in supercritical condition and in the molding method so that the supercritical physical foaming agent may be applied to the injection foaming method.

For example, proposal has been made for a method in which a microcellular foam is obtained by saturating melted resin with a physical foaming agent, then injecting it into the cavity so pressurized (counterpressure) that the foaming agent will not be vaporized while operating the process so that the resin will become unstable when it is oversaturated, and subsequently expanding (core-backing) the volume of the cavity (U.S. Pat. Nos. 4,473,665 and 5,334,356).

In the injection molding method for obtaining a microcellular foam, it is necessary to dissolve a large amount of a physical foaming agent in melted resin so that it will come into oversaturated condition, to feed a physical foaming agent at high pressure and at raised temperature in some cases so that the physical foaming agent may come into supercritical condition in the cylinder of the injection molding machine, and in addition to use a pressure pump or the like to inject the physical foaming agent at a pressure level that will enable the foaming agent to overcome the high resin pressure. Furthermore, such injection molding method requires a system that will open and close the physical foaming agent injection hole made in the cylinder in response to the movement of the screw and will control the motion of the pressure pump, many sensors, and an information processing system; and as a result, such injection molding method becomes complex and expressive.

Furthermore, in the mold, it is necessary to seal the metal surfaces of the mold at the time of pressurizing the cavity (counter-pressurization) and backing the core by bringing the metal surfaces into close contact so that the high-pressure gas will not leak. However, it is difficult to accomplish this with the mold clamping force of a common injection molding machine, and because of this, gas tightness so required is normally attained by use of a packing made of rubber or the like. In spite of that, it has been difficult to produce a large volume of products because such packing slowly becomes worn out as the cavity is heated.

Moreover, since the degree of the gas tightness of the cavity is raised, there has been a possibility that the counter-pressurizing gas is not released from the cavity at the time of injection with the result that there will be a gas holdup in the cavity, causing a dent in molded articles and consequently a decline in their appearance.

Further, in Japanese Patent Publication HEI 11-34129, Japanese Patent Publication HEI 11-34130 and WO 98/31521, proposal has been made for a physical foaming agent to be fed under high pressure into the cylinder from the middle of the cylinder of an injection molding machine having an in-line screw so that the foaming agent will come into supercritical condition. Injection of a physical foaming agent under high pressure will require a pressure pump and complex and expressive equipment.

Proposal is also made for a method in which the injection of a physical foaming agent can be carried out independently of the movement of the screw. For example, proposal is made in Japanese Patent Publication HEI 8-258096 for a method in which a physical foaming agent is injected from the end position of the screw through a hole made in the axial direction of the screw and mixed with melted resin. In this method, since a gas-permeable sintered metal or the like is used to prevent the melted resin from flowing back into the aforesaid injection hole, it is necessary to inject the foaming agent at higher pressure as a pressure loss occurs when the physical foaming agent passes through the sintered metal. Moreover in Japanese Patent Publication HEI 8-85128, proposal is made for a method in which injection foaming is carried out after the resin is impregnated adequately with a physical foaming agent such as carbon dioxide under pressure in the chamber set up between the hopper and cylinder of the injection molding machine and then sent to the cylinder. It is difficult to impregnate the resin with a physical foaming agent at a temperature in the vicinity of room temperature in a short time, and such method is not suitable for industrial continuous production.

Proposal is made for a method in which intermittent injection molding operation is made possible by continuously injecting a physical foaming agent into melted resin, feeding the melted resin to the cylinder of an injection molding machine, and storing the resin in the accumulator or discharging the resin out of the system, except at the time of metering (Japanese Patent Publication HEI 10-230528 and Japanese Patent Publication HEI 10-24436). According to this method, there is no need to conduct the injection of a physical foaming agent in synchronization with the motion of the mold and the screw, but since a pump is used for the purpose of pressurization, the manufacturing equipment becomes expensive. In addition, since the yield of the materials declines as the melted resin is discharged out of the system, the application of the method to the manufacture of inexpensive foam products has been difficult.

To meet the above challenges, the inventors conducted a study strenuously and successfully made the present invention.

DESCRIPTION OF THE INVENTION

Figure 1:
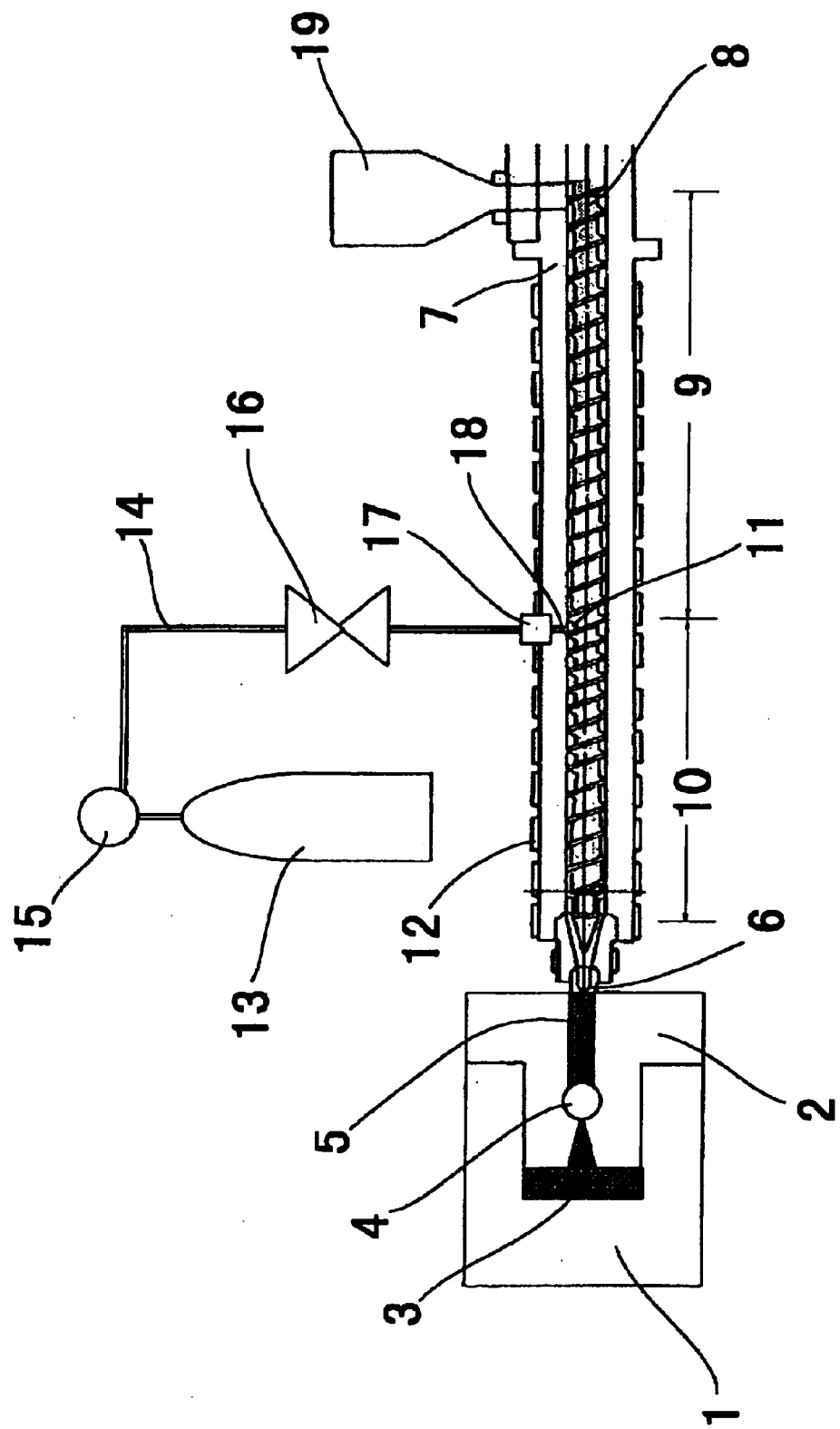
FIG. 1 is a cross-sectional drawing of an injection foaming machine showing an embodiment of the molding process of this invention.

The object of this invention is to provide an injection foaming process which allows a physical foaming agent to be injected into the cylinder of an injection molding machine at low pressure without needing any pressurizing device such as a pump.

The object of this invention is to provide an injection foaming process which allows a physical foaming agent to be injected in synchronization with the movement of the mold and the screw and makes injection foaming possible without keeping the mold at high pressure.

The object of this invention is to provide an injection foaming process which makes injection foaming possible without keeping the cavity in mold at high pressure.

The object of this invention is to provide an injection foaming process which allows a physical foaming agent to be injected into the cylinder of an injection molding machine at low pressure and in synchronization with the movement of the mold and the screw and makes injection foaming possible without keeping the mold at high pressure.

The object of this invention is to provide an injection foaming process which makes the production of injection-foamed articles showing a good appearance and a high expansion ratio.

The object of this invention is to provide an injection molding machine suitable for those injection foaming processes.

The object of this invention is also to provide a resin composition suitable for those injection foaming processes.

This invention provides a process for injection-foaming the thermoplastic resin to which a physical foaming agent is fed from the middle of the cylinder by using an injection molding machine with a two-stage-compression screw, which comprises (1) feeding the physical foaming agent into the cylinder from the storage tank at a pressure lower than storage pressure by a pressure difference between the storage tank and the injection molding machine cylinder, (2) feeding the aforesaid foaming agent within the range from the starting point of the second stage of the screw to a length nine times the outside diameter of the screw in the direction of injection at the time of the screw caused to advance most forward in the direction of injection, and (3) obtaining a foam by making the pressure in the cavity of the mold in the injection molding machine at low pressure including practically atmospheric pressure, injecting the resin into the cavity, and then expanding the volume of the cavity.

This invention provides an injection molding machine for thermoplastic resins which has (1) a physical foaming agent tank, (2) a two-stage-compression screw, (3) a cylinder having a physical foaming agent feeding part in the range from the starting point of the second stage of the screw to a length nine times the outside diameter of the screw in the direction of injection at the time of the screw caused to advance most forward in the direction of injection, and (4) a mold capable of expanding the volume of the cavity.

Furthermore, this invention provides a resin composition to be used for the aforesaid injection foaming process which comprises a thermoplastic resin containing as a foaming nucleator 0.1 to 5 wt % of an inorganic filler having an average particle diameter of 0.5 to 10 µm to the thermoplastic resin and/or 0.01 to 1 wt %, calculated as undecomposed material, of a chemical foaming agent or its decomposed material.

Moreover, this invention provides an injection foaming process wherein the cavity volume is expanded while the melted resin of the aforesaid resin composition which is mixed with a physical foaming agent is being injected into the cavity whose volume is initially set at a lower value than the quantity of the metered resin.

Preferred Embodiment of the Invention:

The injection foaming process of this invention is described in detailed below.

The injection foaming process of this invention is a process for injection-foaming the thermoplastic resin to which a physical foaming agent is fed from the middle of the cylinder by using an injection molding machine with a two-stage-compression screw, which comprises (1) feeding the physical foaming agent into the cylinder from the storage tank at a pressure lower than storage pressure by a pressure difference between the storage tank and the injection molding machine cylinder, (2) feeding the aforesaid foaming agent within the range from the starting point of the second stage of the screw to a length nine times the outside diameter of the screw in the direction of injection at the time of the screw caused to advance most forward in the direction of injection, and (3) obtaining a foam by making the pressure in the cavity of the mold in the injection molding machine at low pressure including practically atmosphere pressure, injecting the resin into the cavity, and then expanding the volume of the cavity.

The present invention can provide an injection foaming process which allows a physical foaming agent to be injected into the cylinder of an injection molding machine at low pressure without needing any pressurizing device such as a pump.

In this invention, the resin is injected into the cavity to fill it, and then the volume of the cavity is expanded after a lapse of a proper time. As an example of a preferable method for accomplishing such expansion, a method in which the metal plates making up the walls of the cavity are moved (the core backing method) can be cited. The method in which those metal plates are moved toward the side of the movable platen on which the mold is mounted is easiest.

In this method, the cavity is filled with the resin at a time to form a skin layer on the surface of the molded article so that a hard product surface can be obtained with the result that even if any bubble of a large cell diameter is formed due to the uneven foamed condition inside the product, such bubble will not have any adverse effect on the appearance of the product. In this sense, this method offers an advantage. Because of this, it is unnecessary to pressurize the inside of the cavity as proposed by conventional technology so that the physical foaming agent will not vaporize. Consequently, in this invention, there is no need to keep the inside of the cavity at high pressure in the form of counterpressure for example, and it is possible to conduct molding at low pressure, even at atmospheric pressure.

Because of this, there is no need to use a rubber packing to keep pressure in the most or to seal the clearance in e mold. Furthermore, in the case of a mold made up of more than one mal plates, the air present in the cavity when the mold is filled with the resin will escape through the clearance between the metal plates when the resin fills the inside of the cavity, and consequently there will be no hold-up of air in the mold, causing no problem of a poor appearance due to an air hold-up.

As the mold clamping mechanism of the injection molding machine used in this invention, the straight hydraulic mold clamping type and the electrically-motor-driven type are used suitably because these types are capable of controlling the speed precisely at the time of core backing. Further, a mold clamping mechanism, such as the toggle type, which has difficulty in carrying out core backing, can be used by using a mechanism such as springs to back the core after releasing the mold clamping force. Even core backing in the direction other than in the movable platen direction can be made possible by moving the metal plates on the sides of the cavities by means of proper hydraulic and electric devices, springs, etc. For example, when a gate is provided in the bottom of a box-shaped article and core backing is conducted in the direction of the bottom, there will be little or no occurrence of foaming on the sides.

With such products, it is possible to effect foaming in all of the five directions by backing the core in the direction of the four sides simultaneously with core backing in the direction of the bottom.

In core backing in any direction other than in the movable platen direction, it is possible to use a T-shaped or Y-shaped hydraulic cylinder in addition to the mold clamping cylinder. Since no counter-pressurization is carried out in this way, it is possible to design a machine in which the metal plates are pulled back for core backing in a complicated manner.

Furthermore, with box-share articles such as containers, it is possible to design them so that they can be assembled after the bottom and sides are molded separately by conducting core backing on the movable platen side alone. Containers produced in such way can be recovered in a compact disassembled form after they are used in transporting goods. Further, with box-shaped articles, they may be injection-molded in a form like a development elevation, with core backing conducted in the movable platen side, and assembled for use as required after they are removed from the mold.

Moreover, if any box-shared article has a section to be folded later as mentioned above, it is possible to crush the foam in the linear area at which the article is folded before the resin is completely solidified by using a mold ejection mechanism so that the linear area will become easy to fold later. This will enable the box-shared article to be assembled easily and make the article stronger in the folded area and resistant to repeated use.

In this invention, it is possible to control the expansion ratio and appearance as required through the temperature and injection speed of the resin injected, the waiting time from the completion of injection to the start of core backing, the amount and speed of core backing, the cooling time after the completion of core backing, etc. Furthermore, core backing may be carried out in several steps, and this makes the production of high-expansion-ratio and fine-cell products possible.

In the injection foaming process, the resin in the area coming in contact with the mold when melted resin is injected into the mold solidifies earlier than the resin inside the molded article. Because of this, a skin layer not foamed is formed, and the product shape is retained by its rigidity. The thickness of this skin layer is preferably not less than 0.1 mm, more preferably not less than 0.3 mm, much more preferably not less than 0.5 mm.

The timing of core backing to be conducted for the formation of a skin layer of such thickness differs with the type of resin, type of foaming agent, mold temperature and resin temperature. For example, in the case of using carbon dioxide as the physical foaming agent and a common polypropylene resin, the timing of core backing is preferably 0.5 to 3 seconds from the completion of injection. If the time from the completion of injection to core backing is too short, a skin layer of adequate thickness will not be formed. And if the time is too long, the solidification of the resin will progress, making it difficult to obtain an adequate expansion ratio even by means of core backing.

The core movement speed at the time of core backing also differs with product thickness, type of resin, type of foaming agent, mold temperature and resin temperature. For example, in the case of using carbon dioxide as the physical foaming agent and a common polypropylene resin, the core movement speed is preferably about 0.01 to 2 mm/min. If the speed is too low, the resin will solidify in the middle of core backing with the result that an adequate expansion will not be achieved. And if the speed is too high, the formation and growth of cells will not follow the movement of the core with the result that the cells will be broken and the appearance will not be satisfactory.

The mold temperature that is commonly used in the molding of resin is adequate. In producing those articles showing a small thickness and a high expansion ratio, it is advisable to set the temperature at a lever a little higher than normal mold temperature. The thickness and expansion ratio of the products obtained by this invention differs with the type of resin, type and addition amount of physical foaming agent, mold temperature and resin temperature, etc. For example, in the case of using carbon dioxide as the physical foaming agent and a common polypropylene resin, products about 0.1 to 100 mm in thickness and 1 to 5 times in expansion ratio can be obtained.

It is easy to obtain products having large wall thickness, a high expansion rate and a uniform cell diameter from a common polypropylene resin to which a proper amount of rubber such as ethylene-propylene rubber, ethylene-butene rubber, ethylene-octene rubber and styrene-butene block rubber or low-density polyethylene has been added. Furthermore, it is also easy to obtain products having large wall thickness, a high expansion rate and a uniform cell diameter from a polypropylene resin having a high-molecular-weight component in its homopolymer section or a slightly cross-linked polypropylene resin. It is possible to obtain products about 200 mm in thickness and about 10 times in expansion ratio from these modified polypropylene resins. Moreover, compared with crystalline resins, noncrystalline styrene-based polymer resin and polycarbonate can be used to produce products having an expansion ratio of nearly 20 times.

According to this invention, it is possible to obtain foam products having a good appearance due to the smoothness and rigidity of the skin layer even if there are some variations taking place in the cell form inside the molded products, cell density and expansion ratio. In this invention, in the case of obtaining products of closed cells, the average cell diameter is about 0.01 to 1 mm. However, there is no problem even with the cell diameter being several millimeters and some of the cells being connected continuously, depending on the form and application of the products.

In the case of products having a high expansion ratio, the cells are joined with one another and connected with one another continuously, and the insides of the products become hollow. However, it is possible to produce products which is light in weight and has high rigidity because there are pillars of oriented resin within the hollow space. These products having a high expansion ratio are most suitable for use as a replacement material for corrugated boards and floats.

Furthermore, in this invention, it is possible to make use of the hot runner, shut-off nozzle, shut-off gate, etc. that are used in common injection molding. The hot runner allows the yield of the material to be improved, while eliminating the occurrence of runners, etc. The shut-off nozzle and the shut-off gate can prevent the product to be subsequently produced from being contaminated due to the resin leaking into the cavity due to the pressure of the physical foaming agent in the melted resin being vaporized at the time of the removal of the product. The shut-off nozzle may be installed at the end of the screw of the injection molding machine, and the shut-off gate may be installed in the mold.

If the volume of the cavity is too small compared with the volume from the shut-off nozzle to the product gate or if the solidification temperature of a resin such as rubber and elastomer is low and the resin is slow in solidifying at the gate and the runner, the resin being filled between the shut-off nozzle and the gate will readily flow into the cavity when foaming is conducted while increasing the volume of the cavity. This may cause an unsatisfactory appearance of the product and a decline in the expansion ratio. In such event, a film gate is employed as the gate. In the case of a pin gate, it is desirable to provide a difference in level in the area surrounding the gate. Furthermore, a method in which the time up to the sealing of the gate after the completion of injection is shortened by making the gate hope small and giving vibrations by means of ultrasonic waves so that the flowability of the resin at the time of injection will be higher and a method in which the volume of the resin channel in the vicinity of the shut-off nozzle is increased slightly immediately after injection so that the resin pressure between the shut-off nozzle and the gate will fall sharply immediately after the shut-off nozzle is closed are also preferable.

In FIG. 1, an example of a mold having a hot runner and a shut-off gate is illustrated as an example of embodiment of this invention. The injection foaming process of this invention is also applicable to the injection method that has been used in the non-foaming injection method in the past.

For example, a method in which the resin is injected into the cavity while letting it be foamed, with a skin made of leather, fabric and thermoplastic elastomer set on the movable platen side of the cavity and with the mold left open, the mold is closed so that the whole mold is filled with the resin, and then the core is again backed (injection press) is applicable to the manufacture of light skinned automotive interior trims such as door trims and pillors.

As an example of the application of multi-layer injection molding, a thermoplastic elastomer containing no physical foaming agent is injected, and/or a thermoplastic elastomer containing a physical foaming agent is injected to be foamed by this invention, and then a substrate material resin such as polypropylene is injection-foamed by the process of this invention, so that they can be applied to the manufacture of light skinned automotive interior trims. Furthermore, it is also possible to carry out injection-foaming (insert molding) by the process of this invention after setting a metal in the mold.

Furthermore, if the volume of the cavity is kept smaller than the metered resin volume, the volume of the cavity is expanded with injection pressure while the melted resin mixed with a physical foaming agent is being injected (injection compression method), and the core is backed after the completion of injection, then a skin layer is formed on the product surface in a short time from the start of injection, reducing to a great extent the occurrence of abnormalities such as flash or silver streak that occur due to the abrupt evaporation of the physical foaming agent on the surface of the molded product, and as a result a product having the same appearance quality as that of a common solid molded product is obtained.

Moreover, when a mold shaped in the form of china bowl is fabricated and set up in the machine, the resin is injected while being foamed with the mold kept open, the foamed resin is let to fill the whole cavity after the mold is closed, and then the core is backed, the foamed resin will reach those wall areas of the container in which the expansion ratio will not rise, with the result that a china bowl whose sides are also foamed is obtained. Such china bowl is best suited for use as the containers of convenience foods because of its lightness.

In this invention, a small degree of variations in the cell form inside a molded product, cell density, expansion ratio, etc. would not affect the quality of molded products. Because of this, there is no limitation put on the melted resin to which a physical foaming agent has been added. For this reason, there is no need to disperse a physical foaming agent into the melted resin highly uniformly as suggested in conventional technology.

In this invention, there is no limitation put on the design of the screw of the injection molding machine. In this invention, the use of a multi-stage compression screw, preferably a two-stage screw and a multi-compression screw is recommended for the screw of the injection molding machine. A screw with compression grooves (with vanes) which has an excellent capability to send melted resin may be used for the second stage though such screw with compression grooves has a lower agitating capability.

In this invention, because of the high capability to send the resin, the groove following the end of the compression screw section of the first stage is made deep so that the resin pressure is lowered sharply. In this section in which pressure is lowered, the melted resin comes into starved condition, and the hollow in which there is no resin is created. A physical foaming agent whose pressure has been reduced preferably to not more than 80% against the storage pressure is supplied to this hollow area.

Below is made an explanation of the injection foaming machine by referring to FIG. 1. The injection foaming machine is equipped with Injection Molding Cylinder 7 and Injection Molding Machine Two-stage Compression Cylinder 8. The Injection Molding Cylinder is heated by Heater 12. The physical foaming agent is injected into the cylinder through Physical Foaming Agent Injection Hole 18 by means of Physical Foaming Agent Pump 13 and Foaming Agent Supply Piping 14 via Bomb Valve 15, Pressure Reducing Valve 16 and Check Valve 17. The first-stage compression section is the section numbered 9, and the second-stage compression section is the section number 10.

FIG. 1 is an illustration showing the screw having advanced most forward in the direction of injection. First-stage Compression Section 9 which sends the pellets supplied from Hopper 19 forward has deep screw grooves. Normally the screw grooves become shallow practically evenly up to the front of the first stage, or the screw grooves remain constant up to a certain point and then become shallow. Due to this design, the resin is compressed, with the air in the resin escaping backward.

After that, at 11, the screw grooves become abruptly deep, with the volume between the screw grooves getting expanded with the result that space is created into which gas may be injected there in addition to the resin. This is called Pressure Reduction Section 11. In this section as well as the compression section of the first stage, normally the screw grooves become shallow practically evenly up to the front of the compression section of the second stage, or the screw grooves remain constant up to a certain point and then become shallow, with the result that the resin is compressed. The physical foaming agent injection hole is located preferably at the point (9D) nine times as long as the screw outside diameter (D) from the starting part of the second-stage compression section, with the screw being in a state of having advanced most forward in the direction of injection, that is, at the position of 0 to 9D, preferably 0 to 3D, of the second-stage compression section.

In the rear section of 0D, that is, in the first-stage compression section, the physical foaming agent would fly away from the hopper outlet or the groove area in the rear of the screw and consequently become useless. In the front section of 9D, the area in which the subsequent mixing of the resin and the physical foaming agent is carried out and the area in which the resin is compressed follow. Because of this, the L/D of the screw as a whole would become very large, the strength of the screw of the injection molding machine would become lower, and the size of the overall injection molding machine would become larger. For this reason, this would be inefficient.

The resin is injected into Cavity 3 of the mold having Mold Core (on the movable side) 1 and Mold Shell (on the stationary side) from Injection Molding Machine Nozzle 6 via Hot Runner 5 and Shut-off Valve 4.

Figure 2:
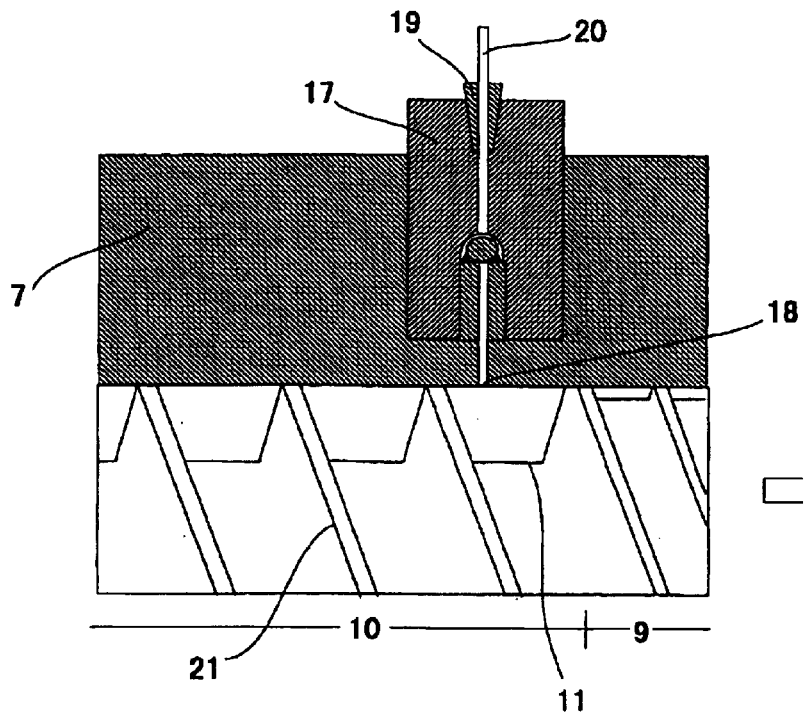
FIG. 2 is a partial cross-sectional drawing of the area of the physical foaming agent injection hole of the injection foaming machine shown in FIG. 1.

FIG. 2 is an enlarged view of the area surrounding this physical foaming agent injection hole. The melted resin is sent forward by the grooves of the compression section 10 and Vane 21 of the screw, and as a result, space in which there is no resin is created in Pressure Reduction Section 11. In Pressure Reduction Section 11, Physical Foaming Agent Injection Hole 18 is made, and the physical foaming agent is injected from Physical Foaming Agent Supply Piping 20. In the state of FIGS. 1 and 2, the pressure in the hollow area is not so high that the physical foaming agent may be injected even at low pressure. To achieve this state, the ratio, L2/L1, between the depth of the last groove of the first stage, L1, and the depth of the first groove of the second stage, L2, is desirably in the range of 1.2 to 6, preferably 2.5 to 4.5.

In addition, considering its resin sending capability and mixing capability, First-stage Compression Section 9 and Second-stage Compression Section 10 may be so designed that it has one, two or 3 grooves. For the design of the depth, etc. of the grooves of the first-stage and second-stage compression sections, the pressure-resistant structure of the vent part of a commercially-available injection molding machine with a vent may be used after reinforcing it if it is within the range as shown above. Further, the design may be such that only the screw is of the type with a vent, while the cylinder is of the common type in which a physical foaming agent injection hole is provided.

Furthermore, a screw so designed that in the screw section of the first-stage compression section, the distance between screw grooves is short in the final 0.5 to 2D part so that the screw grooves will be filled completely with the melted resin shows a significant effect in preventing the physical foaming agent from escaping to the rear side of the screw of the first-stage compression section.

If the screw begins to retract in the opposite direction to the direction of injection from the state shown in FIGS. 1 and 2 (the metering and plasticizing section), the resin thus plasticized is supplied to Pressure Reduction Section 11 from Compression Section 9. The melted resin supplied is mixed to an appropriate degree with the physical foaming agent injected through Physical Foaming Agent Injection Hole 18. In this case, no particular thorough dispersion is required, and the physical foaming agent may be let to be caught by the resin by the pressure of the foaming agent and the shear being developed by the mixing of the resin.

Further, up to the end of the screw whose grooves are to be filled with the melted resin, much of the space to be occupied by the physical foaming agent present in the grooves that is yet to be mixed is either large bubbles connected with one another or a large lump of such bubbles, which are in such distance that they can exert pressure on one another. The pressures of the physical foaming agent in those areas are approximately equal, and the physical foaming agent of practically equal pressure together with the melted resin is sent forward by Vane 21 making up the grooves. In this process, the physical foaming agent is slowly mixed with and dispersed into the melted resin, and as a result a degree of the mixing of the physical foaming agent that will not present any problem at the time of injection foaming is achieved. When the screw retracts further, the resin pressure goes up due to the compression by the screw in Compression Section 10.

A preferable embodiment of the injection molding machine suitable for the injection foaming process of this invention is an injection molding machine for thermoplastic resins which has (1) a physical foaming agent tank, (2) a two-stage-compression screw, (3) a cylinder having a physical foaming agent feeding part in the range from the starting point of the second stage of the screw to a length nine times the outside diameter of the screw in the direction of injection at the time of the screw caused to advance most forward in the direction of injection, and (4) a mold capable of expanding the volume of the cavity.

An injection molding machine whose ratio, L2/L1, between the depth of the last groove of the first stage of the two-stage-compression screw of the aforesaid injection molding machine, L1, and the depth of the first groove of the second stage, L2, is in the range of 1.2 to 6 is another embodiment of the injection molding machine.

In addition, an injection molding machine having a resin check valve in the aforesaid physical foaming agent supply section is also a preferable embodiment of the injection molding machine.

Figure 3:
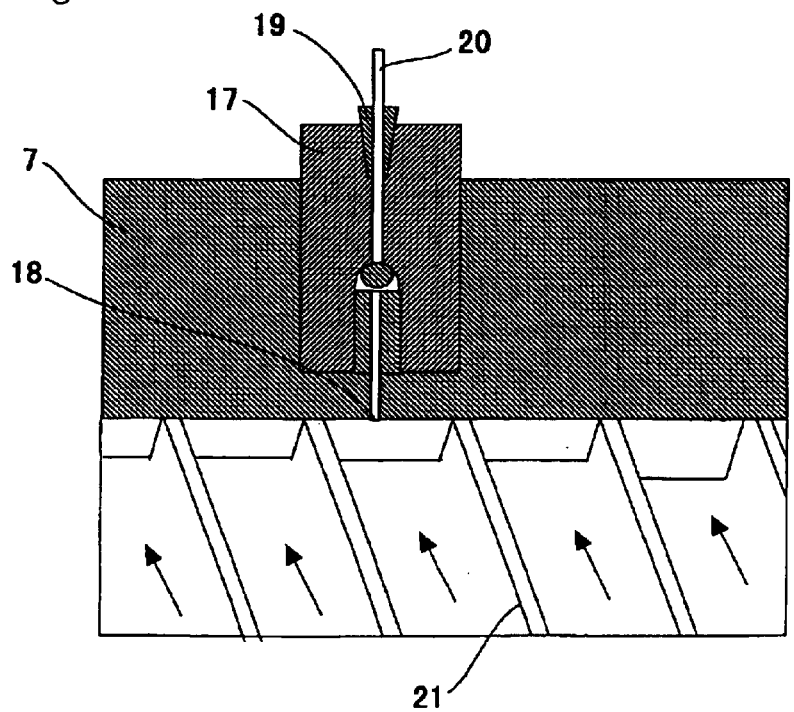
FIG. 3 is a partial cross-sectional drawing showing the closed condition of a check valve installed at the physical foaming agent injection hole shown in FIG. 2.

In the event that the low pressure section cannot be located within the width of the screw metering zone for any reason that the injection molding machine is used for the production of non-foamed products in addition to foamed products, it is suggested that a check valve be installed in the piping for the physical foaming agent so that the melted resin will not flow into the physical foaming agent injection hole. FIGS. 1 and 2 illustrate embodiments equipped with Check Valve 17. FIG. 3 shows an example of a case in which the resin pressure has risen above the injection pressure of the physical foaming agent. When the resin pressure rises above the supply pressure of the physical foaming agent, Check Valve 17 will be actuated, and the supply of the physical foaming agent will stop. The melted resin does not enter the physical foaming agent piping through the action of Check Valve 17. However, since the physical foaming agent yet to be mixed that is present in the rear side (the hopper side) comes in a state of being mixed with the melted resin, there is no such inadequate melting of the physical foaming agent that could present a problem at the time of injection foaming. Further, the arrow in FIG. 3 represents the direction of the resin flow.

Figure 4:
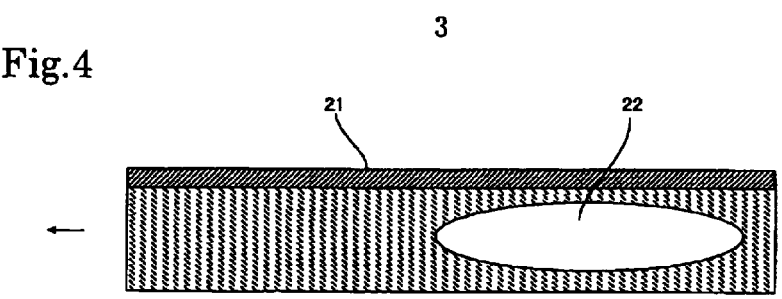
FIG. 4 is a schematic sketch drawn in a continuous plan view showing the condition of the melted resin flowing in the groove of the second-stage compression section of the screw.

FIG. 4 represents a schematic top view of Second-stage-compression Section 10 covering several grooves. Physical Foaming Agent Lump 22 formed by numberless bubbles in the melted resin is mixed with the resin by the pressure of the physical foaming agent and the shear developed by the vanes of the screw and sent forward. Even if the screw retracts, the resin pressure rises, the check value closes and the supply of the physical foaming agent stops, the mixing of the melted resin and the physical foaming agent will continue and the resin mixed with the physical foaming agent will be sent forward, as long as there remains Physical Foaming Agent Lump 22. In this invention, since the pressure of the physical foaming agent supplied is not high, the dissolution of the physical foaming agent in the melted resin proceeds slowly, and it will take a sufficiently long time for Lump 22 to disappear. Further, the arrow in FIG. 4 represents the direction of resin flow.

Consequently, even if the supply of the physical foaming agent is stopped by Check Valve 17, the mixing of the melted resin and the physical foaming agent will continue and the resin mixed with the physical foaming agent will be sent forward, for some time as long as there remains Physical Foaming Agent Lump 22. Moreover, when the plasticization and metering are completed and the screw stops, the mixing of the melted resin and the physical foaming agent will stop temporarily. However, this will not present no problem in the injection molding of the foam product since the resin mixed with the physical foaming agent at an approximately constant concentration is stored in the screw.

Therefore, according to this invention, the supply of the physical foaming agent to the cylinder is conducted intermittently through the movement of the screw, but a mixture of the melted resin and the physical foaming agent is continuously supplied during the plasticizing and metering time, consequently causing no such unevenness in the foaming agent concentration that will cause any problem in appearance, etc. at the time of injection foaming.

Any common physical foaming agents may be used as the foaming agent for use in this invention without any particular problem. Examples of such physical foaming agents include vapors of organic solvents having low boiling point such as methanol, ethanol, propane, butane and pentane; vapors of halogen-based inert solvents such as dichrolomethane, chroloform, carbon tetrachloride, flon and nitrogen trifluoride; and inert gases such as carbon dioxide, nitrogen, argon, helium, neon and astatine.

Out of these, carbon dioxide, nitrogen and argon, which do not have to be vaporized, are inexpensive and involve little danger of environmental pollution and fire are most excellent. As to the method for storing the physical foaming agent, carbon dioxide, nitrogen, etc. may be used as they are in cylinders and may be supplied to the injection molding machine via a pressure reducing valve.

In the case of any facilities for producing foam products on a large scale, storage tanks for liquefied carbon dioxide, liquefied nitrogen, etc. are installed, and these are vaporized through a heat exchanger and supplied to the injection molding machine through a pressure reducing valve via piping.

Further, in the case of physical foaming agents in liquid state, the storage pressure as defined in this invention means the pressure at which the foaming agent is vaporized and supplied to the pressure reducing valve. The storage pressure is preferably in the range of 0.13 to 100 MPa. If the storage pressure is too low, it becomes impossible to inject the foaming agent into the injection molding machine; and if the storage pressure is too high, it becomes necessary to increase the pressure-resistance strength of the storage facilities, resulting in larger size of the facilities, and the extent of damage would become larger in the event of an accident of the bursting of the piping, or the like, which would not be desirable from a viewpoint of safety.

As one of the preferable specific embodiments of the injection foaming process of this invention, the following can be cited:

An injection foaming process for obtaining a foam which comprises (1) continuously or intermittently supplying the physical foaming agent from the storage tank to the cylinder of the injection molding machine through a hole made in the middle of the cylinder by use of the pressure difference with the inside of the cylinder by reducing the pressure of the physical foaming agent to not more than 80% against the storage pressure, (2) the aforesaid cylinder having a two-stage-compression screw that will carry out compression by slowly reducing the volume of the grooves in the direction of injection so that the resin is sent in the direction of injection, with the ratio of L2/L1, between the depth of the last groove of the first stage, L1, and the depth of the first groove of the second stage, L2, is in the range of 1.2 to 6, (3) the physical foaming agent injection hole being positioned in the range from the starting point of the second stage of the screw to a length nine times the outside diameter of the screw in the direction of injection when the screw is caused to advance most forward in the direction of injection, and (4) expanding the volume of the cavity of the mold by bringing the pressure inside the cavity to atmospheric pressure after the injection and filling of the resin.

In this invention, any thermoplastic resin that can be injection-molded in a state of not being foamed may be used without any particular limitation. Examples of such thermoplastic resin include polyethylene such as low density polyethylene, linear low density polyethylene, medium density polyethylene, high density polyethylene, ultra-high molecular-weight polyethylene and cyclic polyethylene; ethylene-based copolymers such as ethylene-acrylate copolymer and ethylene-vinylacetate copolymer; homopolypropylene; random copolymers of propylene and α-olefins such as ethylene, butene, pentene, hexene and octene; polypropylene block copolymers such as ethylene-propylene block copolymer; olefin resins such as polybutene and polymethylpentene; rubbers and elastomers such as polybutylene, polyisobutylene, polybutadiene, natural rubber, thermoplastic polyurethane, isoprene rubber, styrene-butadiene rubber, ethylene-propylene rubber, ethylene-butene rubber, ethylene-octene rubber, ethylene-propylene-diene rubber and chloroprene rubber; and those cross-linked rubbers and elastomers which have been cross-linked to such extent that they can be injection-molded and those ones whose flowability has been improved with polypropylene and mineral oil.

Furthermore, the present invention can apply to styrene-based resins such as polystyrene, AS resis and ABS resin are suitable for high-expansion-ratio foaming. Non-crystalline resins such as polyvinyl chloride, high nitrile resin, methyl polyacrylate, polymethylmethacrylate and polycarbonate and engineering plastics.

As examples, polymethyl pentene, polyphenylene ether, polyphenylene oxide, polyacetal, polyethylene terephthalate, polypropylene terephthalate, polybutylene terephthalate, polylactate, polyether ketone, polyether sulphone, nylon 6, nylon 11, nylon 12, nylon 66, nylon 610, nylon 612, liquid crystal polymer, polyimide, poly-p-phenylene terephthalate and polysulfone can be cited.

Foams of biodegradable resins obtained by mixing polylactate and starch with polyolefins can degrade in short time after they are disposed of.

Furthermore, even with thermoplastic resins, it is possible to injection-foam monomers, polymers, cross-linking agents, etc. having such viscosity that they can be injection-molded, either singly or after blending, by the process of this invention and then cross-link foams thus formed by means of heating, etc. in the mold or after they are removed from the mold. Moreover, it is also possible to increase the expansion ratio by means of the physical foaming agent remaining at the time of the cross-linking and/or owing to the thermal expansion effect within the foam cells. Those products cross-linked after foaming show excellent mechanical properties such as compression recovery properties. Especially in the case of a product having about the same level of hardness as that of rubber or elastomer, it is possible to obtain by reason of the physical foaming agent remaining in the product a foam having a volume 100% to 500% higher than those products expanded as the volume of the cavity is increased, by controlling the cavity volume increase rate to 0.1% to 50% after injection-foaming the resin in the mold cavity and removing the product after heating the mold so that the product is cross-linked.

Further, blends obtained with the objective of improving moldability, mechanical properties, etc. may also be used. Especially, blends of rubbers such as styrene-butadiene rubber, ethylene-propylene rubber, ethylene-butene rubber, ethylene-octene rubber and ethylene-propylene-diene rubber and ethylene-based polymer resins or propylene-based polymer resins are preferable because they provide products having a uniform cell diameter.

Moreover, reprocessed resins such as recycled PET, recycled polypropylene and recycled polystyrene may be used.

These resins, rubber and elastomers may be the ones which have been modified by adding additives such as heat stabilizers, weathering stabilizers, light stabilizers, flame retardants, antistatic agents, antibacterial agents, carbon black and pigments, talc, mica, calcium carbonate, barium sulfate magnesium whisker, potassium titanate whiska and glass fiber as required.

The viscosity of these resins is not unvariable because the conditions for determining MFR (melt flow rate), an index of viscosity, differ with various resins, but MFR does not pose any particular problem if the resins are commercially available and used as common injection-grade resins. For example, in the case of polypropylene, polypropylene resins having MFR of 2 to 100 g/10 min (230° C.) are used satisfactorily. Further, if the polypropylene resin has a broad molecular weight distribution, the resin may be used satisfactorily even if its MFR is 3 or so because the MFR of 3 is equivalent to the flowability of a common polypropylene resin having MFR of 10 or so.

In this invention, the addition of a foaming nucleator shows the effect of making the cell diameter uniform and improving the product appearance. The physical foaming agent dissolved in the resin tends to become a cell formation nucleus when microscopically uneven areas are formed. Because of this, as the types of the foaming agents that can be used, those ones which are made of fine particles or can make use of the molecules formed by reaction decomposition as a foaming nucleator can be cited.

As examples of such fine particles, as inorganic substances, such inorganic fillers as talc, calcium carbonate, magnesium carbonate, aluminum hydroxide, magnesium hydroxide, barium sulfate, mica, clay, silica, alumina, iron oxide, titanium oxide, magnesia, carbon black and graphite can be cited. The average particle size of these inorganic fine particles is preferably 0.5 to 10 $\mu$m. Those fine particles whose surfaces have been treated to make them hydrophobic so that they can be dispersed well show better dispersion properties.

The addition amount of these fine particles is preferably 0.1 to 5 wt % against the raw material resin. Furthermore, considering the contamination of the hopper of the injection molding machine, deposits of powder on the product surface and the wear of the screw, these fine particles may be used after being processed into a masterbatch containing 5 to 50 wt % of fine particles using resin, wax or rubber as the base material, for example.

As a nucleator for reaction, chemical foaming agents can be cited. Chemical foaming agents are decomposed in the cylinder of the injection molding machine, and the foam residues will act as a foaming nucleator.

Examples of these chemical foaming agents include azodicarboxylic acid amide, oxybisbenzenesulfonylhidrazide, azobisisobutylonitrile, dinitrosopentamethylenetetramine and paratoluenesulfonylhydrozide. These examples also include mixtures of polycarboxylic acids such as citric acid, oxalic acid, fumaric acid, phthalic acid, malic acid, tartaric acid, cyclohexane-1, 2-dicarboxylic acid, camphric acid, ethylenediamine tetraacetic acid, triethylenetetramine hexaacetic acid and nitrilo acid and inorganic carbonic acid compounds such as sodium hydrogencarbonate, sodium hydrogencarbonate aluminum and potassium hydrogencarbonate, and salts of polycarboxylic acids such as sodiumdihydrogen citrate and potassium hydrogenoxalate.

Especially, the use of polycarboxylic acid together with an inorganic carbonic acid compound is preferable for polyolefins. Particularly, the use of citric acid together with sodium hydrogencarbonate produces the microcell formation effect, that is, the effect of forming a large amount of form nuclei, and allows foam products with a good appearance to be obtained.

The nucleus forming effect of the use of both citric acid and sodium hydrogencarbonate is extremely high. For example, a polypropylene composition containing 10 to 30 wt % of talc shows an adequate nuclear effect itself. However, the addition of citric acid together with sodium hydrogencarbonate will produce an additional effect of producing microcells.

The addition amount of these chemical foaming agents is preferably 0.01 to 1 wt % against the raw material resin. At less than 0.01 wt %, an adequate nuclear effect is not produced, while at more than 1 wt %, decomposed material may become eye-mucus-like matter, which will contaminate the product in some cases. These chemical foaming agents may be processed to particles having an average particle size of 1 to 100 $\mu$m to be mixed with the raw material resin in advance. Such particles may also be mixed with the raw material resin at the time of injection molding.

Further, those particles may be blended with auxiliaries such as urea, zinc hydroxide, zinc oxide, lead oxide, zinc stearate and calcium stearate. Furthermore, considering the contamination of the hopper of the injection molding machine and deposits of powder on the product surface, these particles may be used after being processed into a masterbatch using resin as the base material. Moreover, these chemical foaming agents may be added to the resin in advance, and then the mixture may be palletized to decompose the agents. In addition, after chemical foaming agents at high concentrations are decomposed in advance, the residues thereof may be added. The addition amount of such chemical foaming agent residues is preferably 0.01 to 1 wt % as converted into materials yet to be dissolved.

According to this invention, a commercially available physical foaming agent stored in a bomb, etc. is supplied to the injection molding machine at low and constant pressure through a pressure reducing valve. Because of this, in comparison with the conventional method in which a physical foaming agent is supplied to the injection molding machine by pressuring it by means of a pump, etc., the physical foaming agent supply device is simple and inexpensive, and no pressure higher than the bomb pressure is applied to the physical foaming agent piping. As a result, the system of this invention is not prone to an accident, and even if an accident should happen, the extent of the damage therefrom is small.

Furthermore, the supply of a physical foaming agent is started or stopped by a difference between physical foaming agent injection pressure and pressure in the hollow inside of the cylinder. This eliminates the necessity for any complex mechanism. Specifically, compared with the method in which a physical foaming agent is injected by means of a pump, no such large electrical and mechanical system as operates a pump to synchronize with the movement of the mold and the screw is needed. Instead, a conventional injection molding machine may be used with minor modifications made to it. Further, the inside of the mold may be left at atmospheric pressure before injection, and no counter-pressurization device, etc. are required. The air inside the mold will escape through the clearance between the metal plates making up the mold, and consequently the products will rarely have a poor appearance due to a hold-up of air.

Moreover, in this invention, in the case of a common thermoplastic resin showing no rubber elasticity, the expansion ratio is practically determined by the core-backing amount of the mold. Because of this, products showing excellent dimensional and quality stability can be obtained even if the mixing ratio of the physical foaming agent fluctuates to some extent.

As examples of the foam products that can be produced by this invention, the following can be cited by applications:

Stationery and office-automation equipment: Files, mouse pads, sheaths of pencils and ball-point pens, staplers, letter cases, handles of knives and scissors, safes, personal computers, printers, housings of HDD, FDD, ZIP, MO, CD, DVD, CD-R, CD-W disks, backs of chairs and arm chairs, handles of drivers, etc.

Electrical appliances: Refrigerators, TV sets, videos, housings of air conditioners, radio cones, microphones, sonar, parabola antenna, air conditioners for outside installation, fan vanes, vanes of wind power generators, lids of rice cookers, jars and pots, etc.

Automotive parts: Arm rests, head rests, floor mats, side moles, noise absorbing materials, gasoline floats, bumpers, door handles, glove boxes, fresh air outlets, console boxes, ceiling materials, wheel caps, pillars, instrument panels, air bag covers, levers, air cleaner cases, resonators, cowl top garnishes, deaf garnishes, door trims, spoilers, etc.

Logistic areas: Resin pallets, containers, plastic corrugated boxes, CD and DVD transportation cases, bag handles, cushioning materials, etc.

Civil engineering and construction areas: Thermal insulation pipe for air conditioners, etc., concrete panels, outdoor thermal insulation materials, drainage mass, cushioning floor materials, tatami mat core materials, fusuma sliding doors, substitute materials for wooden materials of kitchen fixtures, lids of bathtubs, drainboards, crate-like molded articles, bench and table boards, etc.

Sports areas: Soles of sports shoes, sandals, slippers, protectors, swimming suit cups, golf bags, life jackets, and beat boards Agricultural and fishery areas: Flowerpots, floats of fishing nets, gunwale protection materials, life preservers, floats of oil fences, etc.

Food packaging materials areas: Boxes used for carrying goods to customers, containers for instant noodles, boxes for lunch sold at convenient stores, bowls, food trays, packing, closures for glass milk bottles, substitute materials for cork, teacups, dishes, chopping boards, etc.

Medical areas: Containers for transporting blood, pillors, health mats, etc.

EXAMPLES

The following Examples are intended to further illustrate the process of this invention and are not intended t limit the scope of this invention in any manner.

In the Examples of this invention, measurements were taken by the following methods:

(1) Addition amount of the physical foaming agent: A bomb of the physical foaming agent is connected to the injection molding machine via a pressure reducing valve, and the physical foaming agent was continuously discharged out of the system at the set temperature of the molding machine cylinder at the time of the molding of the resin and at the rotary speed of the screw at the time of injection without being injected into the mold. The amount of the physical foaming agent consumed at this time was calculated from the amount of decrease in the weight of the physical foaming agent bomb and determined from a calibration curve determining the relationship between the injection pressure and amount of the physical foaming agent.

(2) Expansion ratio: The expansion ratio was determined from the specific gravity of the product including the skin layer.

(3) Average cell diameter: The cross section of the foamed section of a foam product was observed by use of a microscope, and the average diameter of 10 to 20 cells was taken as the average cell diameter. Furthermore, if the cell diameter exceeds the product thickness, the dimension in the direction crossing at right angles the direction of the product thickness of the cell not less than 50 mm away from the gate was taken as the cell diameter.

(4) Maximum cell diameter: The largest cell diameter out of the cell diameters from which the average cell diameter had been calculated was taken as the maximum cell diameter.

(5) Skin layer thickness: The average of the thicknesses of the product on the movable and stationary sides was taken as the skin layer thickness.

(6) Melt flow rate (MFR): Measurement was taken at each specified temperature at a load of 2.1; 6 kg in accordance with ASTM 1238-65T.

Examples 1 to 3

A screw which had the L/D ratio of 27, the screw outside diameter of 69.8 mm, the first-stage compression section having the L/D ratio of 14D (the flat area having 7.3 mm of groove depth from the hopper bottom was 9D, and the following area in which the groove depth decreased evenly from 7.3 mm to 3.1 mm is 5D), and the second-stage compression section having the L/D ratio of 13D (the flat area having 11 mm of groove depth from the hopper bottom was 7D, and the area in which the groove depth decreased evenly from 11 mm to 5 mm is 6D) was mounted on IS-450GS-27 (mold clamping force: 450 tons; the straight-hydraulic mold clamping system), available from Toshiba Machine Co., Ltd., which was used as the injection molding machine. The distance between the grooves in the screw was constant. A physical foaming agent injection hole having 2 mm of inside diameter was made in the cylinder at a location corresponding to the 2D area of the second-stage compression section at the time of the screw having advanced most in the direction of injection, and a check valve was installed on the outside of the hole. The end of the cylinder is equipped with the mechanism of a shut-off nozzle.

The carbon dioxide supplied in a commercially available bomb was used as the physical foaming agent, and a mechanism capable of injecting carbon dioxide into the cylinder via a pressure reducing valve and the check valve installed in the cylinder was installed. The carbon dioxide bomb pressure was 7.2 MPa, and the pressure of carbon dioxide supply to the injection molding machine was kept to 3 MPa via a pressure reducing valve. The injection amount of carbon dioxide was 1 wt % against the resin.

As a mold for the injection molding, a mold which was capable of making the fine adjustment of the clearance (product thickness) of the cavity for a product 95 mm×340 mm in size by means of the hydraulic system of the molding machine and was of such structure that the melted resin is injected at the center of the product through a direct gate was mounted on the injection molding machine. The injection molding machine was so set that the molding temperature would be 50° C., molding cooling time, 60 seconds, and resin temperature at the time of injection, 230° C.

As the molding material, a block polypropylene J704ZA (available from Grand Polymer Co., Ltd.; MFR: 5 g/10 min (230° C.)) was used.

The injection molding machine was also so set that at the time of injection, the mold would be fully filled in the cavity clearance with the melted resin yet to be foamed. The time from the completion of injection to the start of core backing was 1 second, and the core backing speed was set at 1 mm/sec. Table 1 shows the clearance in the cavity of the mold at the times of injection, start of core backing and completion of core backing.

The injection foaming was carried out under the conditions as described above. The average cell diameter was large, and there was an occurrence of flash or silver streak. However, there was no problem in the shape of the product, indicating that the injection foaming could be used to provide those products which would not be critical as to appearance, such as logistic pallets.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 1.

depth decreased evenly from 11 mm to 5 mm is 6D). The location of the injection of the physical foaming agent was the same as in the case of Example 1. Attempt was made to inject carbon dioxide in the same manner as described in Example 1, but it was completely impossible to do so on account of high resin pressure. Results are shown in Table 1.

TABLE 1

|  | Ex. 1 | Ex. 2 | Ex. 3 | Comp. Ex. 1 | Comp. Ex. 2 | Comp. Ex. 3 |
|---|---|---|---|---|---|---|
| PP J704ZA (phr) | 100 | 100 | 100 | 100 | 100 | 100 |
| $CO_2$ cylinder pressure (MPa) | 7.2 | 7.2 | 7.2 | 7.2 | 7.2 | 7.2 |
| $CO_2$ injection pressure (MPa) | 3 | 3 | 3 | 3 | 3 | 3 |
| $CO_2$ injection amount (wt %) | 1 | 1 | 1 | 1 | 1 | 1 |
| Cavity distance (mm) |  |  |  |  |  |  |
| At start of injection | 2 | 2 | 2 | 2 | Physical foaming agent: not Injected | Physical foaming agent: not Injected |
| At completion of injection | 2 | 2 | 2 | 2 |  |  |
| At completion of core backing | 4 | 3 | 7 | 4 |  |  |
| Product thickness ($\mu$m) | 4 | 3 | 7 | 4 | — | — |
| Expansion ratio (times) | 2 | 1.5 | 3.5 | 1.8 | — | — |
| Average cell diameter ($\mu$m) | 1000 | 1010 | Connected | 800 | — | — |
| Max. cell diameter ($\mu$m) | 20000 | 18000 | Connected | 20000 | — | — |
| Skin layer thickness ($\mu$m) | 400 | 410 | 380 | 50 | — | — |
| Smoothness | Smooth | Smooth | Smooth | Terminal area: not filled | — | — |
| Flash or silver streak | Yes | Yes | Yes | Yes | — | — |

Comparative Example 1

The resin was injected into the cavity in the same manner as described in Example 1 except that the cavity clearance was set to 4 mm and the core backing was not conducted.

Simultaneously with the injection, the resin spread in the cavity while being foamed. The resin was foamed up to about 75% of the volume of the cavity. However, in the terminal area, the shape varied at each shot, and the appearance was bad. Therefore, the product had no commercial value.

Comparative Example 2

The cylinder of the injection molding machine mentioned in Example 1 was replaced with a cylinder in which a physical foaming agent injection hole was made as in the case of Example 1 in the area of 12D from the starting area of the second stage of the screw, and a check valve was installed.

Attempt was made to inject carbon dioxide under the same conditions as described in Example 1, but it was completely impossible to do so on account of high resin pressure. Results are shown in Table 1.

Comparative Example 3

The cylinder of the injection molding machine mentioned in Example 1 was replaced with a cylinder which had the first-stage compression section having the L/D ratio of 14D (the flat area having 7.3 mm of groove depth from the hopper bottom was 9D, and the following area in which the groove depth decreased evenly from 7.3 mm to 3.1 mm is 5D), and the second-stage compression section having the L/D ratio of 13D (the flat area having 11 mm of groove depth from the hopper bottom was 7D, and the area in which the groove Examples 4 to 6

Injection foaming was carried out in the same manner as described in Examples 1 to 3 except that as the foaming agent, 0.04 wt % citric acid and 0.06 wt % sodium hydrogencarbonate were added.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 2.

Compared with Examples 1 to 3, the cell diameter was uniform, and microcells were formed. Compared with Examples 1 to 3, the average cell diameter was small, and the appearance was better.

Comparative Example 4

The resin was injected into the cavity in the same manner as described in Example 4 except that the cavity clearance was set to 4 mm and the core backing was not conducted. Simultaneously with the injection, the resin spread in the cavity while being foamed. The resin was foamed up to about 75% of the volume of the cavity. However, in the terminal area, the shape varied at each shot, and the appearance was bad. Therefore, the product had no commercial value.

The appearance was the same as in Comparative Example 1, and the addition of citric acid and sodium hydrogencarbonate had no effect.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 2.

TABLE 2

|  | Example 4 | Example 5 | Example 6 | Comp. Ex.4 |
|---|---|---|---|---|
| PP J704ZA (phr) | 100 | 100 | 100 | 100 |
| $CO_2$ cylinder pressure (MPa) | 7.2 | 7.2 | 7.2 | 7.2 |
| $CO_2$ injection pressure (MPa) | 3 | 3 | 3 | 3 |
| $CO_2$ injection amount (wt %) | 1 | 1 | 1 | 1 |
| Citric acid (wt %) | 0.04 | 0.04 | 0.04 | 0.04 |
| $NaHCO_3$ (wt %) | 0.06 | 0.06 | 0.06 | 0.06 |
| Cavity distance (mm) At start of injection | 2 | 2 | 2 | 4 |
| At completion of injection | 2 | 2 | 2 | 4 |
| At completion of core backing | 4 | 3 | 7 | 4 |
| Product thickness (mm) | 4 | 3 | 7 | 4 |
| Expansion ratio (times) | 2 | 1.5 | 3.5 | 1.8 |
| Average cell diameter (μm) | 400 | 300 | Connected | 810 |
| Max. cell diameter (μm) | 900 | 750 | Connected | 1000 |
| Skin layer thickness (μm) | 410 | 405 | 385 | 50 |
| Smoothness | Smooth | Smooth | Smooth | Terminal area: not filled |
| Flash or silver streak | Yes | Yes | Yes | Yes |

Examples 7 to 9

Molding was carried out in the same manner as described in Examples 4 to 6 except that the cavity clearance at the time of injection was 1 mm, there was no mold clamping pressure at the time of injection, the resin was injected into the cavity, and then the core was backed at injection pressure. Compared with Examples 4 to 6, there was no occurrence of flash or silver streak, and the appearance was about the same as that of a solid product.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 3.

TABLE 3

|  | Example 7 | Example 8 | Example 9 |
|---|---|---|---|
| PP J704ZA (phr) | 100 | 100 | 100 |
| $CO_2$ cylinder pressure (MPa) | 7.2 | 7.2 | 7.2 |
| $CO_2$ injection pressure (MPa) | 3 | 3 | 3 |
| $CO_2$ injection amount (wt %) | 1 | 1 | 1 |
| Citric acid (wt %) | 0.04 | 0.04 | 0.04 |
| $NaHCO_3$ (wt %) | 0.06 | 0.06 | 0.06 |
| Cavity distance (mm) At start of injection | 1 | 1 | 1 |
| At completion of injection | 2 | 2 | 2 |
| At completion of core backing | 4 | 3 | 7 |
| Product thickness (mm) | 4 | 3 | 7 |
| Expansion ratio (times) | 2 | 1.5 | 3.5 |
| Average cell diameter (μm) | 350 | 320 | 400 |
| Max. cell diameter (μm) | 750 | 700 | 800 |
| Skin layer thickness (μm) | 510 | 510 | 550 |
| Smoothness | Smooth | Smooth | Smooth |
| Flash or silver streak | No | No | No |

Examples 10 to 12

A foam product was obtained by following the same procedures as described in Examples 7 to 9 except that polypropylene and citric acid or sodium hydrogencarbonate were mixed in the same ratio and pelletized by use of a simple extruder with a 50-mm vent, while removing bubbles via the vent at 220 degrees to be used as the resin.

There was no occurrence of flash or silver streak, and the product had about the same appearance as the products of Examples 7 to 9.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 4.

TABLE 4

|  | Example 10 | Example 11 | Example 12 |
|---|---|---|---|
| PP J704ZA (phr) | 100 | 100 | 100 |
| $CO_2$ cylinder pressure (MPa) | 7.2 | 7.2 | 7.2 |
| $CO_2$ injection pressure (MPa) | 3 | 3 | 3 |
| $CO_2$ injection amount (wt %) | 1 | 1 | 1 |
| Citric acid (wt %) | 0.04 | 0.04 | 0.04 |
| $NaHCO_3$ (wt %) | 0.06 | 0.06 | 0.06 |
| Cavity distance (mm) At start of injection | 1 | 1 | 1 |
| At completion of injection | 2 | 2 | 2 |
| At completion of core backing | 4 | 3 | 7 |
| Product thickness (mm) | 4 | 3 | 7 |
| Expansion ratio (times) | 2 | 1.5 | 3.5 |
| Average cell diameter (μm) | 480 | 330 | 470 |
| Max. cell diameter (μm) | 800 | 750 | 800 |
| Skin layer thickness (μm) | 520 | 520 | 540 |
| Smoothness | Smooth | Smooth | Smooth |
| Flash or silver streak | No | No | No |

Examples 13 to 17

A foam product was obtained by following the same procedures as described in Example 7 except that the cavity clearance after core backing was fixed at 4 mm and the addition amount of citric acid or sodium hydrogencarbonate and the addition amount of carbon dioxide were changed as shown in Table 5.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 5.

TABLE 5

|  | Ex. 13 | Ex. 14 | Ex. 15 | Ex. 16 | Ex. 17 |
|---|---|---|---|---|---|
| PP J704ZA (phr) | 100 | 100 | 100 | 100 | 100 |
| $CO_2$ cylinder pressure (MPa) | 7.2 | 7.2 | 7.2 | 7.2 | 7.2 |
| $CO_2$ injection pressure (MPa) | 5 | 2 | 2 | 0.8 | 0.8 |
| $CO_2$ injection amount (wt %) | 1.7 | 0.7 | 0.7 | 0.25 | 0.25 |
| Citric acid (wt %) | 0.04 | 0.04 | 0.1 | 0.04 | 0.04 |
| $NaHCO_3$ (wt %) | 0.06 | 0.06 | 0.2 | 0.04 | 0.2 |
| Cavity distance (mm) At start of injection | 1 | 1 | 1 | 1 | 1 |
| At completion of injection | 2 | 2 | 2 | 2 | 2 |
| At completion of core backing | 4 | 4 | 4 | 4 | 4 |
| Product thickness (mm) | 4 | 4 | 4 | 4 | 4 |
| Expansion ratio (times) | 2 | 2 | 2 | 2 | 2 |
| Average cell diameter (μm) | 350 | 360 | 300 | 400 | 350 |
| Max. cell diameter (μm) | 700 | 750 | 600 | 800 | 800 |
| Skin layer thickness (μm) | 500 | 520 | 510 | 505 | 580 |
| Smoothness | Smooth | Smooth | Smooth | Smooth | Smooth |
| Flash or silver streak | No | No | No | No | No |

Examples 18 to 20

A foam product was obtained by following the same procedures as described in Examples 7 and 9 except that carbon dioxide as the physical foaming agent was replaced with nitrogen, its injection pressure was set at 4 MPa, and the addition amount was set at 0.7 wt %.

Compared with Examples 7 to 9, there was flash or silver streak.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 6.

TABLE 6

|  | Example 18 | Example 19 | Example 20 |
|---|---|---|---|
| PP J704ZA (phr) | 100 | 100 | 100 |
| $CO_2$ cylinder pressure (MPa) | 15 | 15 | 15 |
| $CO_2$ injection pressure (MPa) | 4 | 4 | 4 |
| $CO_2$ injection amount (wt %) | 0.8 | 0.8 | 0.8 |
| Citric acid (wt %) | 0.04 | 0.04 | 0.04 |
| $NaHCO_3$ (wt %) | 0.06 | 0.06 | 0.06 |
| Cavity distance (mm) At start of injection | 1 | 1 | 1 |
| At completion of injection | 2 | 2 | 2 |
| At completion of core backing | 4 | 3 | 7 |
| Product thickness (mm) | 4 | 3 | 7 |
| Expansion ratio (times) | 2 | 1.5 | 3.5 |
| Average cell diameter (μm) | 320 | 310 | 350 |
| Max. cell diameter (μm) | 700 | 600 | 700 |
| Skin layer thickness (μm) | 600 | 500 | 600 |
| Smoothness | Smooth | Smooth | Smooth |
| Flash or silver streak | Slightly | Slightly | Slightly |

Examples 21 to 23

A foam product was obtained by following the same procedures as described in Examples 7 and 9 except that citric acid and sodium hydrogencarbonate as the foaming nuleator were replaced with 1 wt % talc (average particle size: 10 μm).

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 7.

TABLE 7

|  | Example 21 | Example 22 | Example 23 |
|---|---|---|---|
| PP J704ZA (phr) | 100 | 100 | 100 |
| $CO_2$ cylinder pressure (MPa) | 7.2 | 7.2 | 7.2 |
| $CO_2$ injection pressure (MPa) | 3 | 3 | 3 |
| $CO_2$ injection amount (wt %) | 1 | 1 | 1 |
| Talc (wt %) | 0.1 | 0.1 | 0.1 |
| Cavity distance (mm) At start of injection | 1 | 1 | 1 |
| At completion of injection | 2 | 2 | 2 |
| At completion of core backing | 4 | 3 | 7 |
| Product thickness (mm) | 4 | 3 | 7 |
| Expansion ratio (times) | 2 | 1.5 | 3.5 |
| Average cell diameter (μm) | 700 | 650 | 800 |
| Max. cell diameter (μm) | 1500 | 1400 | 1800 |
| Skin layer thickness (μm) | 480 | 500 | 580 |
| Smoothness | Smooth | Smooth | Smooth |
| Flash or silver streak | No | No | No |

Examples 24 to 27

A foam product was obtained by following the same procedures as described in Examples 7 and 9 except that the resin was replaced with a high impact polystyrene resin H238 (available from Japan Polystyrene Inc.; MFR: 16 g/10 min (200° C.)) or an ABS resin Classtic™ GA-501 (available from Japan A and L Co., Ltd.; MFR: 32 g/10 min (200° C.)), citric acid and sodium hydrogencarbonate, or talc, was used as the foaming nucleator, the conditions were set for a mold temperature of 50° C., mold cooling time of 60 sec, and injection resin temperature of 230° C., and the amount of core backing was changed as shown in Table 8.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 8.

TABLE 8

|  | Example 24 | Example 25 | Example 26 | Example 27 |
|---|---|---|---|---|
| HIPS H238 (phr) | 100 | 100 |  |  |
| ABS GA-501 (phr) |  |  | 100 | 100 |
| $CO_2$ cylinder pressure (MPa) | 7.2 | 7.2 | 7.2 | 7.2 |
| $CO_2$ injection pressure (MPa) | 5 | 5 | 5 | 5 |
| $CO_2$ injection amount (wt %) | 1.7 | 1.7 | 1.7 | 1.7 |
| Citric acid (wt %) | 0.04 |  | 0.04 |  |
| $NaHCO_3$ (wt %) | 0.06 |  | 0.06 |  |

TABLE 8-continued

|  |  | Example 24 | Example 25 | Example 26 | Example 27 |
|---|---|---|---|---|---|
| Talc (wt %) | | | 1 | | 1 |
| Cavity distance (mm) | At start of injection | 1 | 1 | 1 | 1 |
| | At completion of injection | 2 | 2 | 2 | 2 |
| | At completion of core backing | 14 | 14 | 14 | 14 |
| Product thickness (mm) | | 14 | 14 | 14 | 14 |
| Expansion ratio (times) | | 7 | 7 | 7 | 7 |
| Average cell diameter ($\mu$m) | | 350 | 400 | 360 | 400 |
| Max. cell diameter ($\mu$m) | | 700 | 800 | 710 | 750 |
| Skin layer thickness ($\mu$m) | | 300 | 310 | 320 | 320 |
| Smoothness | | Smooth | Smooth | Smooth | Smooth |
| Flash or silver streak | | No | No | No | No |

Examples 28 and 29

60 parts by weight of oil-extended EPDM pellets obtained by blending 40 parts by weight of a mineral oil-based softener (Dina Process Oil PW-380 available from Idemitsu Kosan Co., Ltd.) with 100 parts by weight of ethylene-propylene-5-ethylidene-2-norbornene copolymer containing an olefin-based thermoplastic elastomer and ethylene content of 78 mol % and has an iodine value of 13 and Mooney viscosity [$ML_{1+4}$(100° C.)] of 140, 25 parts by weight of propylene-ethylene block copolymer pellets having an ethylene content of 8 wt % and an MFR of 10 g/10 min (230° C.), 15 parts by weight of ethylene-4-methyl-1-butene copolymer pellets having an ethylene content of 97 wt % and an MFR of 10 g/10 min (230° C.), and a solution blend of 0.2 parts by weight of 1,3-bis(tert-butylperoxyisopropyl) benzene and 0.2 parts by weight of divinylbenzene were mixed by use of a tumbling mixer. This solution was caused to be adsorbed onto the surface of the mixed pellets uniformly, these pellets were extruded at 230° C. by means of a twin-screw extruder (TEM-50 available from Toshiba Machine Co., Ltd.) and was subjected dynamic heat treatment to form a crosslinked thermoplastic elastomer having a gel content of 95 wt %. This crosslinked thermoplastic elastomer was used for the thermoplastic resin of this invention.

A foam product was obtained by following the same procedures as described in Examples 7 and 9 except that the resin was replaced with the thermoplastic elastomer obtained as described, the conditions were set for a mold temperature of 50° C., mold cooling time of 60 sec, and injection resin temperature of 230° C., the time from the completion of injection to the start of core backing was set at 2.0 sec, and the amount of core backing was changed as shown in Table 9. When the product was removed from the mold, it was found that the product was larger than the size of the mold.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 9.

TABLE 9

|  |  | Example 28 | Example 29 |
|---|---|---|---|
| Thermoplastic elastomer (phr) | | 100 | 100 |
| $CO_2$ cylinder pressure (MPa) | | 7.2 | 7.2 |
| $CO_2$ injection pressure (MPa) | | 3 | 3 |
| $CO_2$ injection amount (wt %) | | 1 | 1 |
| Citric acid (wt %) | | 0.04 | 0.04 |
| $NaHCO_3$ (wt %) | | 0.06 | 0.06 |
| Cavity distance (mm) | At start of injection | 1.5 | 1.5 |
| | At completion of injection | 2 | 2 |
| | At completion of core backing | 3 | 4 |
| Product thickness (mm) | | 4.5 | 6 |
| Expansion ratio (times) | | 2.5 | 3.2 |
| Average cell diameter ($\mu$m) | | 340 | 390 |
| Max. cell diameter ($\mu$m) | | 500 | 600 |
| Skin layer thickness ($\mu$m) | | 200 | 210 |
| Smoothness | | Smooth | Smooth |
| Flash or silver streak | | No | No |

Examples 30 and 31

A foam product was obtained by following the same procedures as described in Examples 7 and 9 except that the resin was replaced with reprocessed pellets (recovered material from the market; a blend of 10 wt % polyethylene and 20 wt % polypropylene), 1 wt % talc, was used as the foaming nucleator, the conditions were set for a mold temperature of 50° C., mold cooling time of 60 sec, and injection resin temperature of 270° C., the time from the completion of injection to the start of core backing was set at 0.5 sec, and the amount of core backing was changed as shown in Table 10.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 10.

TABLE 10

|  |  | Example 30 | Example 31 |
|---|---|---|---|
| PP J704ZA (phr) | | 100 | 100 |
| $CO_2$ cylinder pressure (MPa) | | 7.2 | 7.2 |
| $CO_2$ injection pressure (MPa) | | 4 | 4 |
| $CO_2$ injection amount (wt %) | | 1.3 | 1.3 |
| Talc (wt %) | | 0.5 | 0.5 |
| Cavity distance (mm) | At start of injection | 1 | 1 |
| | At completion of injection | 2 | 2 |
| | At completion of core backing | 3 | 4 |
| Product thickness (mm) | | 3 | 4 |
| Expansion ratio (times) | | 1.5 | 2 |
| Average cell diameter ($\mu$m) | | 390 | 450 |
| Max. cell diameter ($\mu$m) | | 600 | 700 |
| Skin layer thickness ($\mu$m) | | 500 | 510 |
| Smoothness | | Smooth | Smooth |
| Flash or silver streak | | No | No |

Examples 32 to 34

A foam product was obtained by following the same procedures as described in Examples 7 and 9 except that the thermoplastic resin was replaced with a high density polyethylene resin Hi-zex™ 2100J (available from Mitsui Chemicals, Inc.; MFR: 6 g/10 min/10 min (190° C.)), an ethylene-methacrylate copolymer Nucrel™ N1525

(available from DuPont-Mitsui Polychemicals Co., Ltd.; MFR: 25 g/10 min (190° C.); methacrylate content: 15 wt %), and a polyethylene-methacrylate ionomer resin Himilan™ 1650 (available from DuPont-Mitsui Polychemicals Co., Ltd.; MFR: 5 g/10 min (190° C.); zinc ion type) were blended to obtain the composition shown in Table 11, the conditions were set for a mold temperature of 35° C., mold cooling time of 60 sec and injection resin temperature of 180° C., the time from the completion of injection to the start of core backing was set at 1.0 sec, and the amount of core backing was changed as shown in Table 11.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 11.

TABLE 11

|  |  | Example 32 | Example 33 | Example 34 |
|---|---|---|---|---|
| HDPE 2100J (phr) | | 100 | | |
| MAPL N1525 (phr) | | | 100 | 80 |
| Ionomer 1650 (phr) | | | | 20 |
| $CO_2$ cylinder pressure (MPa) | | 7.2 | 7.2 | 7.2 |
| $CO_2$ injection pressure (MPa) | | 3 | 3 | 3 |
| $CO_2$ injection amount (wt %) | | 1 | 1 | 1 |
| Citric acid (wt %) | | 0.04 | 0.04 | 0.04 |
| $NaHCO_3$ (wt %) | | 0.06 | 0.06 | 0.06 |
| Cavity distance (mm) | At start of injection | 1 | 1 | 1 |
| | At completion of injection | 2 | 2 | 2 |
| | At completion of core backing | 4 | 4 | 4 |
| Product thickness (mm) | | 4 | 4 | 4 |
| Expansion ratio (times) | | 2 | 2 | 2 |
| Average cell diameter (µm) | | 450 | 200 | 150 |
| Max. cell diameter (µm) | | 900 | 500 | 400 |
| Skin layer thickness (µm) | | 450 | 250 | 280 |
| Smoothness | | Smooth | Smooth | Smooth |
| Flash or silver streak | | No | No | No |

Examples 35 to 37

Pellets (MFR: 70 g/10 min (230° C.)) obtained by adding 20 parts by weight of an ethylene-α-olefin rubber Tafmer™ H3530 (available from Mitsui Chemicals, Inc.; MFR: 35 g/10 min (230° C.)) to Grand Polypro™ J739 (available from Grand Polymer Co., Ltd.; a block polypropylene; MFR: 90 g/10 min (190° C.)) and pelletizing them at 200° C. by means of a 36-mm twin-screw extruder were used for the resin. For the mold, a rectangular concave-shaped mold 50 mm deep which is 550 long×300 mm wide and has a concave surface on the movable platen side (with a hot runner set at 200° C. and a two-point shut-off gate) was mounted on the injection molding machine, with a thermoplastic elastomer sheet placed on the movable platen side which comprised a skin material (a sponge layer comprising foamed polypropylene (thickness: 2 mm) and a thermoplastic elastomer sheet skin (thickness: 0.5 mm). The conditions were set for a mold temperature of 50° C., mold cooling time of 80 sec and injection resin temperature of 230° C., and carbon dioxide was used as the physical foaming agent. The cavity clearance at the time of the start of injection was set at 10 mm, the clearance was reduced to 2 m immediately after injection, and the core was backed to 4 mm after 1 sec from the start of injection.

The pressure of the physical foaming agent bomb, injection pressure, addition amount, cavity clearance, thickness of the foam product, expansion ratio, average cell diameter, maximum cell diameter, skin layer thickness, and occurrence of wrinkle and bulge of skin are shown in Table 12.

TABLE 12

|  |  | Example 35 | Example 36 | Example 37 |
|---|---|---|---|---|
| PP J739 (phr) | | 80 | 80 | 80 |
| Tafmer H3530 (phr) | | 20 | 20 | 20 |
| $CO_2$ cylinder pressure (MPa) | | 7.2 | 7.2 | 7.2 |
| $CO_2$ injection pressure (MPa) | | 0.9 | 0.9 | 0.9 |
| $CO_2$ injection amount (wt %) | | 0.3 | 0.3 | 0.3 |
| Citric acid (wt %) | | 0.04 | 0.04 | 0.04 |
| $NaHCO_3$ (wt %) | | 0.06 | 0.06 | 0.06 |
| Cavity distance (mm) | At start of injection | 10 | 10 | 10 |
| | At completion of injection | 2 | 2 | 2 |
| | At completion of core backing | 3 | 4 | 5 |
| Product thickness (mm) | | 3 | 4 | 5 |
| Expansion ratio (times) | | 1.5 | 2 | 2.5 |
| Average cell diameter (µm) | | 250 | 300 | 350 |
| Max. cell diameter (µm) | | 400 | 500 | 550 |
| Skin layer thickness (µm) | | 450 | 400 | 380 |
| Wrinkle of skin | | No | No | No |
| Bulge of skin | | No | No | No |

Example 38

A mold for a china bowl (diameter of the open top: 140 mm; diameter of the bottom: 110 mm; height: 80 mm, with a direct gate in the bottom; cavity clearance at the bottom: 1 mm; cavity clearance at the side: 1 mm) was mounted on the injection molding machine. Grand Polypro™ J707 (available from Grand Polymer Co., Ltd.; a block polypropylene resin; MFR: 23 g/10 min (230° C.)) was used for the resin, and the conditions were set for a mold temperature of 50° C., mold cooling time of 80 sec and injection resin temperature of 220° C. The cavity clearance at the time of the start of injection was set at 0.4 mm. The clearance was enlarged while the resin was being injected up to 1 mm, and then the core was backed to 2 mm. The time from the completion of injection to the start of core backing was set at 0.5 sec. Carbon dioxide was used as the physical foaming agent.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 13.

Example 39

With the mold left open at the time of injection, injection was carried out at the same metering position as described in Example 38. Immediately after that, the mold was closed until the cavity clearance became 1.6 mm, and the core was backed to 2 mm. The time from the completion of injection to the start of core backing was set at 0.5 sec. Compared with Example 38, the expansion ratio on the side of the product china bowl was higher.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 13.

TABLE 13

|  |  | Example 38 | Example 39 |
|---|---|---|---|
| PP J707 (phr) | | 100 | 100 |
| $CO_2$ cylinder pressure (MPa) | | 7.2 | 7.2 |
| $CO_2$ injection pressure (MPa) | | 4 | 4 |
| $CO_2$ injection amount (wt %) | | 1.3 | 1.3 |
| Citric acid (wt %) | | 0.05 | 0.05 |
| $NaHCO_3$ (wt %) | | 0.10 | 0.10 |
| Cavity distance (mm) | At start of injection | 0.4 | 20 |
| | At completion of injection | 1 | 20 |
| | At start of core backing | 1 | 1.6 |
| | At completion of core backing | 2 | 2 |
| Side part | Product thickness (mm) | 1.2 | 1.2 |
| | Expansion ratio (times) | 1.2 | 1.6 |
| | Average cell diameter ($\mu$m) | 300 | 500 |
| | Max. cell diameter ($\mu$m) | 590 | 900 |
| | Skin layer thickness ($\mu$m) | 400 | 200 |
| Bottom part | Product thickness (mm) | 2 | 2 |
| | Expansion ratio (times) | 2 | 1.8 |
| | Average cell diameter ($\mu$m) | 400 | 450 |
| | Max. cell diameter ($\mu$m) | 800 | 900 |
| | Skin layer thickness ($\mu$m) | 300 | 200 |

Examples 40 and 41

Grand Polypro™ J709 (available from Grand Polymer Co., Ltd.; a block polypropylene resin; MFR: 55 g/10 min (230° C.)) was used for the resin. As the mold, a mold for a lunch box of the shape shown in FIG. 5 was mounted. A film gate was used. The cavity clearance at the time of the start of injection was set at 0.2 mm. The time from the completion of injection to the start of core backing was set at 0.5 sec, and the core was backed to 0.4 mm or 0.6 mm. The conditions were set for a mold temperature of 70° C., mold cooling time of 50 sec, and injection resin temperature of 230° C.

Figure 5:
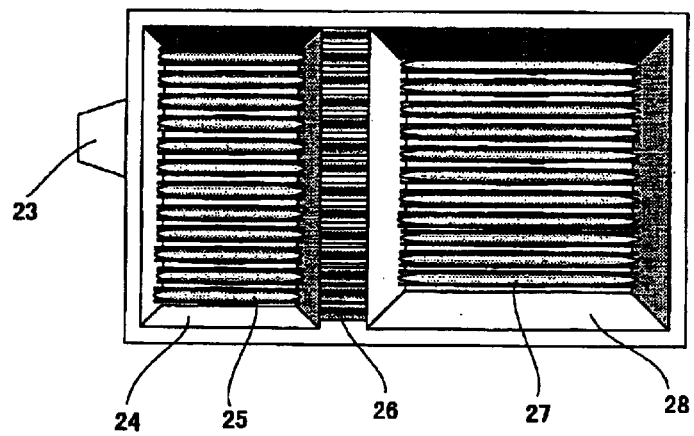
FIG. 5 is a plan view of a lunch box, an example of a molded article obtained by the injection foaming process of this invention.

The mold for a lunch box shown in FIG. 5 has film gate 23, an area in which non-rice food is to be packed 24, protruding and retreating sections for improving flexural strength 25, a partition 26, protruding and retreating sections for improving stregth 27, and an area 28 in which cooked rice is to be packed.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 14.

TABLE 14

|  |  | Example 40 | Example 41 |
|---|---|---|---|
| PP J709W (phr) | | 100 | 100 |
| $CO_2$ cylinder pressure (MPa) | | 7.2 | 7.2 |
| $CO_2$ injection pressure (MPa) | | 3 | 3 |
| $CO_2$ injection amount (wt %) | | 1 | 1 |
| Citric acid (wt %) | | 0.05 | 0.05 |
| $NaHCO_3$ (wt %) | | 0.10 | 0.10 |
| Cavity distance (mm) | At start of injection | 0.2 | 0.2 |
| | At completion of injection | 0.2 | 0.2 |
| | At completion of core backing | 0.4 | 0.6 |
| Product thickness (mm) | | 0.4 | 0.6 |
| Expansion ratio (times) | | 2 | 3 |
| Average cell diameter ($\mu$m) | | 200 | 250 |
| Max. cell diameter ($\mu$m) | | 400 | 410 |
| Skin layer thickness ($\mu$m) | | 100 | 110 |

Examples 42 and 43

Figure 6:
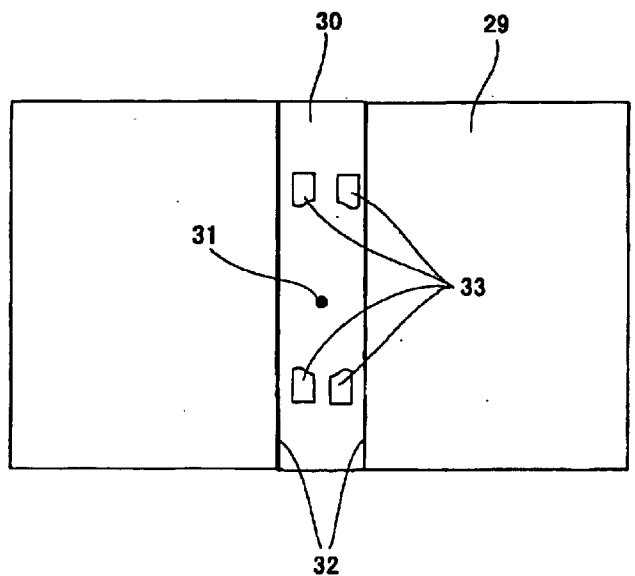
FIG. 6 is a plan view showing a file, an example of a molded article obtained by the injection foaming process of this invention.

Grand Polypro™ J705 (available from Grand Polymer Co., Ltd.; a block polypropylene resin; MFR: 10 g/10 min (230° C.)) was used for the resin. As the mold, a mold for a A4 file of the shape shown in FIG. 6 was mounted, and injection was carried out from the back cover side. The mold for the file shown in FIG. 6 has file front cover section 29, back cover section 30, gate 31, hinge section 32 and metal fitting attachment section 33.

The mold was chamfered so that the edges of the file would be round. The time from the completion of injection to the start of core backing was set at 0.5 sec, and the core was backed to 1.5 m or 2 mm. 5 sec after that, the clearance was compressed to 1.4 mm or 1.9 mm, respectively, to prevent the warpage of the product.

The pressure of the physical foaming agent bomb, injection pressure, addition amount, cavity clearance, thickness of the foam product, expansion ratio, average cell diameter, maximum cell diameter, skin layer thickness, smoothness and status of occurrence of flash or silver streak are shown in Table 15.

TABLE 15

|  |  | Example 42 | Example 43 |
|---|---|---|---|
| PP J705 (phr) | | 100 | 100 |
| $CO_2$ cylinder pressure (MPa) | | 7.2 | 7.2 |
| $CO_2$ injection pressure (MPa) | | 1.2 | 1.2 |
| $CO_2$ injection amount (wt %) | | 0.4 | 0.4 |
| Citric acid (wt %) | | 0.04 | 0.04 |
| $NaHCO_3$ (wt %) | | 0.4 | 0.4 |
| Cavity distance (mm) | At start of injection | 0.4 | 0.4 |
| | At completion of injection | 1 | 1 |
| | At start of core backing | 1 | 1.6 |
| | At completion of core backing | 1.5 | 2 |
| Product thickness (mm) | | 1.4 | 1.9 |
| Expansion ratio (times) | | 1.4 | 1.9 |
| Average cell diameter ($\mu$m) | | 300 | 350 |
| Max. cell diameter ($\mu$m) | | 400 | 405 |
| Skin layer thickness ($\mu$m) | | 250 | 280 |

Example 44

The same injection molding machine as Example 1 was used. The distance between the grooves in the screw was constant. A physical foaming agent injection hole having 2 mm of inside diameter was made in the cylinder at a location corresponding to the 2D area of the second-stage compression section at the time of the screw having advanced most in the direction of injection, and a check valve was installed on the outside of the hole. The end of the cylinder is equipped with the mechanism of a shut-off nozzle. The nitrogen supplied in a commercially available cylinder was used as the physical foaming agent, and a mechanism capable of injecting nitrogen into the cylinder via a pressure reducing valve and the check valve installed in the cylinder was installed. The nitrogen bomb pressure was 28 MPa, and the pressure of nitrogen supply to the injection molding machine was kept to 13 MPa via a pressure reducing valve. The injection amount of nitrogen was 1 wt % against the resin.

As the injection molding mold, a mold which was capable of making the fine adjustment of the clearance (product thickness) of the cavity for a product 95 mm×340 mm in size by means of the hydraulic system of the molding machine and was of such structure that the melted resin is injected at the center of the product through a direct gate was mounted on the injection molding machine. The injection molding machine was so set that the molding temperature would be 50° C., molding cooling time, 60 seconds, and resin temperature at the time of injection, 250° C.

As the molding material, polylactate LACEA™ H100PL (available from Mitsui Chemicals, Inc.; MFR: 20 g/10 min (190° C.)) was used. As the foaming nucleator, 0.04 wt % citric acid and 0.06 wt % sodium hydrogencarbonate were added in the form of masterbatch.

A product of an expansion ratio of 2 times was obtained by setting the cavity clearance at 1 mm and expanding the cavity clearance to 4 mm 1 sec after the completion of injection. The injection amount of the physical foaming agent was 10 wt %. Results are shown in Table 16.

Example 45

Molding was carried out with the same amount of the nucleator and under the same core backing conditions as described in Example, with the cavity clearance at the time of injection set at 1 mm, not mold clamping pressure present at the time of injection, and the core backed at injection pressure after the injection of the resin into the cavity.

Compared with Example 44, there was no occurrence of flash or silver streak, and the appearance of the product was about the same as that of solid products. Results are shown in Table 16.

TABLE 16

| | | Example 44 | Example 45 |
|---|---|---|---|
| Thermoplastic resin (phr) | | Polylactate | Polylactate |
| Citric acid (wt %) | | 0.03 | 0.03 |
| NaHCO$_3$ (wt %) | | 0.03 | 0.03 |
| Cavity distance (mm) | At start of injection | 2 | 1 |
| | At completion of injection | 2 | 2 |
| | At completion of core backing | 4 | 4 |
| Average cell diameter ($\mu$m) | Distance from gate (mm) | 30 | 40 |
| | 0 | | |
| | 20 | 20 | 30 |
| | 40 | 20 | 20 |
| | 60 | 20 | 20 |
| Max. cell diameter ($\mu$m) | Distance from gate (mm) | 50 | 60 |
| | 0 | | |
| | 20 | 40 | 50 |
| | 40 | 30 | 30 |
| | 60 | 30 | 30 |
| Min. cell diameter ($\mu$m) | Distance from gate (mm) | 20 | 22 |
| | 0 | | |
| | 20 | 16 | 15 |
| | 40 | 14 | 13 |
| | 60 | 12 | 12 |
| Flash or silver streak | | Yes | Yes |

What we claim is:

1. A process for injection-foaming a thermoplastic resin using an injection molding machine having a two-stage compression screw within a cylinder and to which a physical foaming agent is fed at a point of the cylinder, wherein the screw comprises a first stage and a second stage, and wherein the screw moves forward and backward in the cylinder, comprising:
   (1) feeding the physical foaming agent into the cylinder from a storage tank at a pressure lower than storage pressure by a pressure difference between the storage tank and the injection molding machine cylinder;
   (2) feeding the foaming agent to the cylinder at a point within a range from the starting point of the second stage of the screw to a point determined by nine times the outside diameter of the screw in the direction of injection at the time the screw is caused to advance most forward in the direction of injection, wherein a hollow area in which there is no resin, is present at the second stage of the screw, and wherein the foaming agent is supplied to the hollow area; and
   (3) obtaining a foam by reducing the pressure in a cavity of the mold in the injection molding machine to a predetermined pressure, injecting the resin into the cavity, and then expanding the volume of the cavity.

2. The injection foaming process according to claim 1 wherein the volume of the cavity is expanded by retracting metal plates in the mold after injecting and filling the resin into the cavity.

3. The injection foaming process of claim 1 wherein the ratio of L2/L1, between the depth of the last groove of the first stage of the two-stage compression screw, L1, and the depth of the first groove of the second stage of the two-stage compression screw, L2, is in the range of 1.2 to 6.

4. The injection foaming process of claim 2 wherein the ratio of L2/L1, between the depth of the last groove of the first stage of the two-stage compression screw, L1, and the depth of the first groove of the second stage of the two-stage compression screw, L2, is in the range of 1.2 to 6.

5. The injection foaming process of claim 1 wherein the physical foaming agent is fed to the molding machine at a lower pressure that is not more than 80% of the storage pressure and is in a gas state or in supercritical condition.

6. The injection foaming process of claim 4 wherein the physical foaming agent is fed to the molding machine at a lower pressure that is not more than 80% of the storage pressure and is in a gas state or in supercritical condition.

7. The injection foaming process of claim 1 further comprising feeding the physical foaming agent through a resin check valve installed at the point of entry of the physical foaming agent.

8. The injection foaming process of claim 6 further comprising feeding the physical foaming agent through a resin check valve installed at the point of entry of the physical foaming agent.

9. The injection foaming process of claim 1 wherein the physical foaming agent is carbon dioxide, nitrogen or argon.

10. The injection foaming process of claim 8 wherein the physical foaming agent is carbon dioxide, nitrogen or argon.

11. The injection foaming process of claim 1 further comprising feeding a resin into the first stage of the two-stage compression screw, which resin comprises a thermoplastic resin containing as a foaming nucleator 0.1 to 5 wt % of an inorganic filler having an average particle diameter of 0.5 to 10 $\mu$m to the thermoplastic resin and/or 0.01 to 1 wt %, calculated as undecomposed material, of a chemical foaming agent or its decomposed material.

12. The injection foaming process of claim 11 wherein the inorganic filler is talc, silica, calcium carbonate or barium sulfate.

13. The injection foaming process of claim 11 wherein the chemical foaming agent is a mixture of polycarboxylic acid and hydrogen carbonate at a ratio of 0.1:0.9 to 0.9:0.1 or its decomposed material.

14. The injection foaming process of claim 11 wherein the chemical foaming agent is a mixture of citric acid and sodium hydrogencarbonate at a ratio of 0.1:0.9 to 0.9:0.1 or its decomposed material.

15. The injection foaming process of claim 11 wherein the thermoplastic resin is a polyolefin.

16. The injection foaming process of claim 1 wherein the mold cavity has a volume initially set at a value lower than the quantity of resin being injected.

17. The injection foaming process of claim 11 wherein the mold cavity has a volume initially set at a value lower than the quantity of resin being injected.

* * * * *